Feb. 21, 1933.                M. V. MILLER                1,898,308
                            ADVERTISING DEVICE
                          Filed Nov. 12, 1931           2 Sheets-Sheet 1
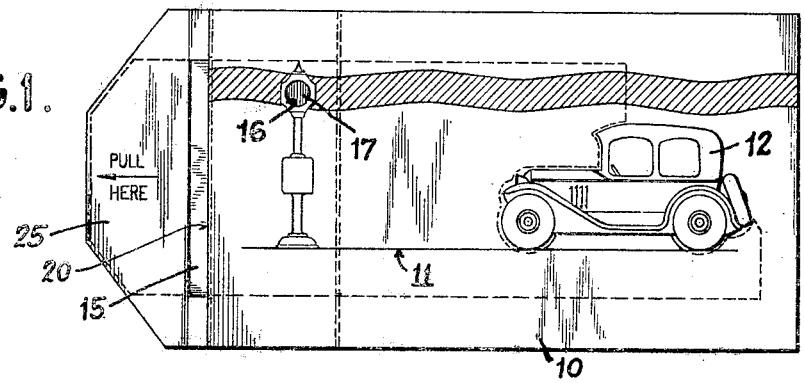
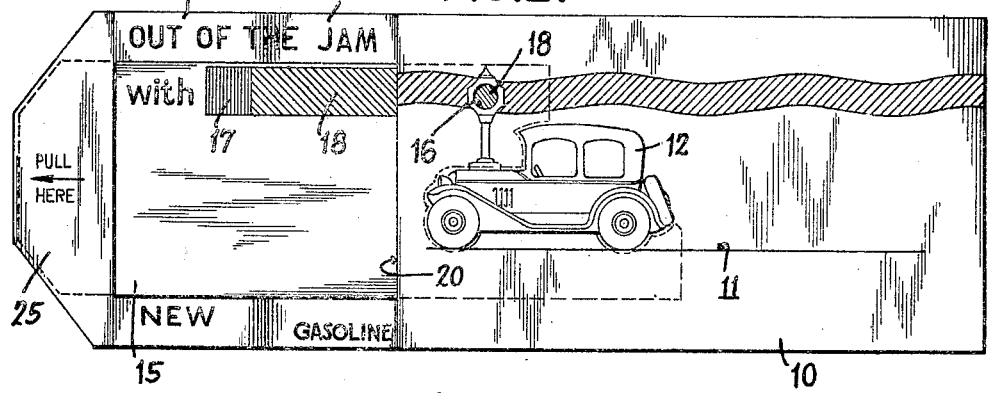
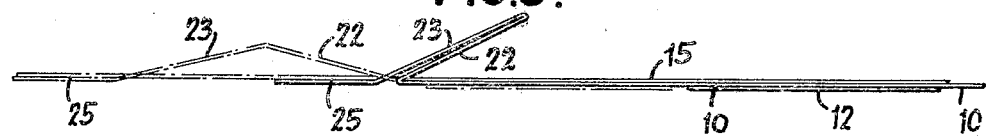
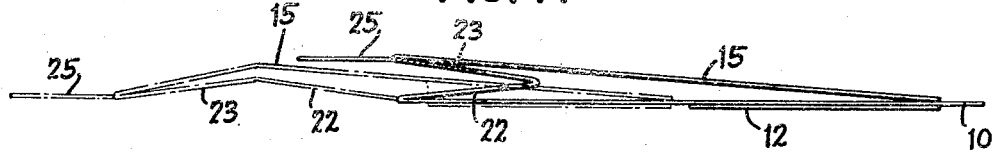
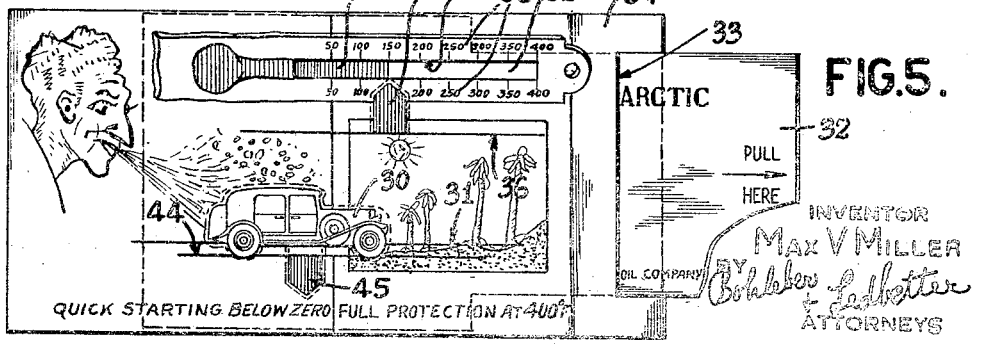

Feb. 21, 1933.   M. V. MILLER   1,898,308
ADVERTISING DEVICE
Filed Nov. 12, 1931   2 Sheets-Sheet 2
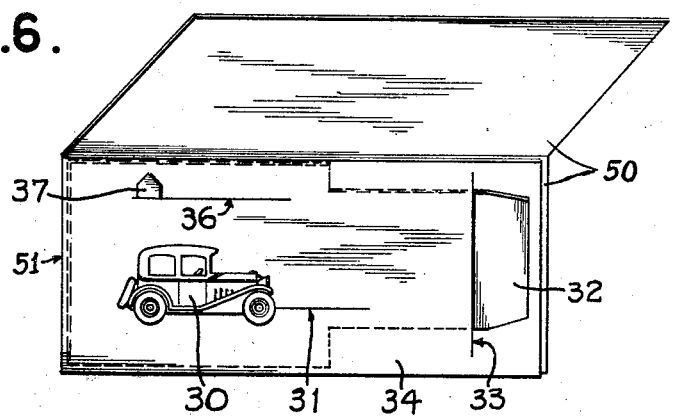
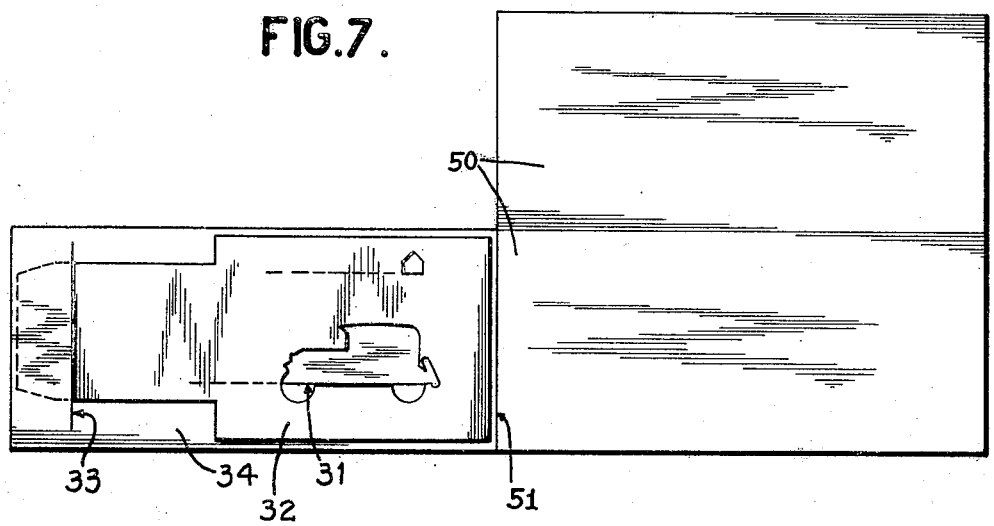
INVENTOR
Max V. Miller
BY
Bohleber & Ledbetter
ATTORNEYS Patented Feb. 21, 1933

1,898,308

UNITED STATES PATENT OFFICE

MAX V. MILLER, OF NEW YORK, N. Y.

ADVERTISING DEVICE

Application filed November 12, 1931. Serial No. 574,477.

The invention relates to an advertising device in which a figure is movable relatively to a carrying surface or background member. The advertising device has wide application to numerous figures and uses, although the figure shown and particularly described herein is an automobile which moves relatively to or over the background.

An object of the invention is to provide an advertising device in which a movable figure or member is movable over a background surface or member and in which there is associated with the movable figure an indicator which refers to some fact or incident simultaneously with the motion of the figure and may relate thereto.

Another object of the invention is to construct an advertising device in which an automobile is movable over a background surface or member and a temperature indicating means is movable therewith.

Another object of the invention is to devise an advertising device in which an automobile is movable over a background surface in which background surface a window or opening is provided to show at least one change of color within the opening in accordance with the movement of the automobile.

Another object of the invention is to construct an advertising device in which a figure is movable over a background surface, the movement of the figure being obtained by a new and novel construction.

Other objects of the invention will be more apparent from the following description taken in connection with the accompanying drawings, showing the preferred embodiment of the invention, in which:

Figure 1 is a front view of the advertising device in initial position with the movable figure in position upon or in front of the background surface. An opening is also shown in the background surface through which the slider which carries the vehicle is visible. The slider may be colored with any desired color, which changes to a different color upon movement of the automobile over the background surface in order to simulate a traffic signal.

Figure 2 shows the advertising device opened out so that the movable figure or automobile upon the background surface has moved relatively thereto.

Figure 3 is an edge view of the device showing one construction by which the movement of the figure and the movement or change of the indicator may be accomplished.

Figure 4 shows another construction by means of which the movement of the figure may be obtained upon the background surface with a movement of or change in the indicator.

Figure 5 shows the movable vehicle upon the background surface associated with three indicators which indicators show changes in temperature upon the movement of the figure or vehicle.

Figure 6 illustrates the manner in which the advertising device may be associated with a folder so that the advertising device is suitable for mailing without the use of an envelope.

Figure 7 illustrates the folder of Figure 6 and the advertising device carried thereby opened out and thereby showing the manner in which the mailable advertising device is constructed and folded.

The advertising device of the invention has a wide range of use and is suited to illustrate by means of movable figures and indicators certain conditions or facts of interest relatively to the movable figure displayed. In the device as illustrated herein, the conditions or facts indicated are climate or varying degrees of temperatures under which the usual automobile operates or an indicator having a visual relation to the figure such as the traffic light. Because of the movement and the novel relation thereof to the figure, interest is created immediately and the story which the advertising device is intended to convey is emphasized and therefore remains fixed in the reader's mind. In the particular application of the device shown herein, the varying climatic and temperature conditions under which an automobile must necessarily operate is used to illustrate one use of the device and the traffic light illustrates a second fact of interest in relation to automobiles.

Obviously, the invention as an advertising device has considerably greater applicability than to an automobile and to the facts or conditions under which an automobile must operate. Such varied use for the advertising device is shown by the manner in which the device may be used to emphasize the pick-up quality of a particular gasoline, or it may be the car itself, by a movable figure and an indicator. Although the two forms illustrated and described herein are directed to the characteristics and situations under which an automobile operates, the device has a wider range of applicability and may be used with a great variety of figures and data or incidents associated with the particular figure used.

The advertising device as mentioned hereinbefore, consists of a background member or surface 10 in which there is a slot 11 through which a figure 12 projects so that the figure is super-imposed over the background. The figure 12 is carried by or forms part of a slider 15 which slider is concealed behind the background member as shown in the dotted lines. This is accomplished by cutting around the outline of the figure 12 throughout its major portion but leaving a part connecting the slider and figure. The figure is then projected through the slot 11.

The background 10 may also have an opening 16 therein through which a portion of the slider 15 is visible. The portion of the slider which is visible through the opening 16 may be colored as shown by the portion 17 in Figure 2 which has the color red. The slider 15 may also carry, if desired, a different color 18 extending from and in longitudinal alignment with the color 17 so that upon movement of the slider to the left as illustrated in Figure 2, this other color 18, which may be green, appears within the opening 16 and thereby producing a change of color visible through the opening. It is clear that any desired color or colors may be used for this purpose and any desired number of changes of color may also be resorted to. Similarly, there may be no specific change in color provided upon the slider but the color of the entire slider may be utilized to produce one of the changes of color visible through the opening.

A vertical slot 20 may be provided adjacent to or at the end of the background member 10 through which the slider 15 projects. The slot 20 renders a portion of the slider visible and readily grasped from the front of the background member. The slot 20 also assists in holding the slide in position upon the background member and guides the slider when it is pulled in order to obtain movement of the automobile 12 relatively to the background. The slider 15 thereby provides a portion which is normally invisible or in back of the background member in initial position of the figure or automobile 12 and becomes visible for advertising material upon being pulled by which movement of the car 12 is obtained relatively to the background 10. The movement of the car 12 over the background member 10 is permitted because of the length of the longitudinal slot 11. The slider 15 may be pushed inwardly again upon which the car 12 moves to the right and returns to its former position and the color appearing in the opening 16 returns to the color 17 originally appearing therein.

The slider or sliding member 15 may be permanently secured to the background member 10 so that the two parts may not be separated and lost by a construction which will nevertheless permit movement of the slider and the figure carried thereby. In this construction the background member 10 is folded to form a double fold consisting of one fold 22 and a second fold 23. The folds 22 and 23 overlap each other and the slide or sliding member 15 is attached to the outer edge of the outer fold 23. The inner edge of the inner fold 22 is secured to or forms a part of the background member 10 and preferably this fold begins at the slit 20 therein, although the bend may occur at any other position. A tab 25 may be provided by the fold and the slider or by one of these parts. It is immaterial whether the folds 22 and 23 are integral or form a part of the background member or the slider since the same result is obtained by either construction and, in fact, all parts may be formed from a single piece.

In closed or normal position as shown in Figure 1, the folds bend inwardly in overlapping relation as shown in Figure 3, to be concealed behind the background. Upon pulling outwardly or to the left as indicated by the words pull here and the arrow, the slider is pulled to the left relatively to the background member 10 and the vehicle moves to the left therewith so that it moves relatively to the background member 10 or over its surface. The folds 22 and 23 open out as shown in dot and dash lines in Figure 3, until the fold is completely opened and the slider has reached its extreme open position as shown in Figure 2, with the vehicle 12 at the left of the background member 10. It will be observed therefore that by this double fold the slider 15 obtains a range of movement relatively to the background member 10 substantially equivalent to the length of both of the folds 22 and 23. The folds when opened out also provide a surface for advertising material which is normally invisible when folded beyond the background member 10 but becomes visible upon opening out when the slider 15 is pulled to the left.

A somewhat different construction of the double fold is shown in Figure 4. In this form of the invention, the background member 10 is not vertically slotted for the slider 15. The slider, on the other hand, is secured directly to the outer end of the outer fold 23 so that the folds 22 and 23 in closed position take a position between the background member 10 and the slider 15, as shown in Figure 4. In this construction of the double fold the same extent of movement of the slider 15 to the left may be obtained which is substantially equivalent to the lengths of the two folds 22 and 23. In partially opened position the slider and the folds assume the position shown in dot and dash lines and when fully open, the position of folds and slider is essentially the same as shown in Figure 3. In this construction, it may be advisable to have the slider 15 carry a crease for folding corresponding in length and position with the crease between the folds 22 and 23, although this is not essential. This enables free sliding action of the slide 15 for the construction shown in Figure 4 since the slider must necessarily bend around the backwardly extending folds when the slider has moved through only half of its normal movement.

A different form of indicator from that shown in the advertising device of Figures 1 and 2 is shown in Figure 5. In the advertising device of Figure 5, the automobile 30 projects through a slot 31 corresponding with the car and slot of the construction of Figure 1. The car 30 is also carried upon a slider 32 projecting through a guide slot 33 adjacent the end of the background member 34. The background member 34 carries a second longitudinal slot 36 through which projects a pointer 37 which pointer is also carried by the slider 32 so that the pointer moves over or relatively to the background with the automobile 30. The pointer moves along a scale 38 or along indicia intending to indicate degrees of temperature as measured by a thermometer.

An elongated opening 39 is also provided in the background 34 through which the slider 32 is visible. The slider at the point beneath or in alignment with the elongated opening carries coloring 40 in order to indicate and simulate the upward movement of the liquid in a thermometer tube. The color 40 is preferably concealed beneath the background until the slider is pulled. The color then appears and moves to the right with the indicating pointer 37 and forms thereby a moving indicator simulating an actual thermometer for indicating varying degrees of temperature. It is clear that this movement of the colored portion 40 upon the slider 32 may be used to indicate other units of measurement or may be used for other purposes as desired.

The background member 34 may also carry another or third slot 44 through which a second pointer or indicator 45 projects. This pointer is also carried by the slider 32 and is movable with the vehicle 30. This pointer indicates changes in temperature in a general manner, such as pointing to indicia of words or numbers or both, indicating low temperatures and moving with the vehicle to a position which indicates higher temperatures or varying conditions of some other sort.

The temperature variation from one point to the other of the movable figure may be indicated also by a general outline simulating cold conditions such as a winter scene, and hot conditions or higher temperatures may be suggested and indicated by some device carrying a thought of heat such as a desert scene, the movable figure moving from one condition to the other upon pulling of the slider. As in the other forms, a portion of the slider 32 is normally concealed in back of the background member 34. This concealed portion of the slider is suitable for advertising material which is ordinarily invisible but comes into view upon pulling the slider as indicated by the words pull here and the arrow. Pulling the slider also advances the automobile 30 from a position adjacent one end of the background to another position spaced therefrom. The indicators 37, 40 and 45 move therewith in the manner described above.

Any one of the advertising devices described herein and shown in Figures 1 through 5 is suitable without change or with such modifications as may be desirable for attachment to a mailing folder or the background may form an integral part of the mailing folder. This construction is shown in Figures 6 and 7 and includes the advertising device as shown either in Figure 1 or Figure 5, but preferably the latter since it will form a sheet of only two thicknesses of material, whereas that of Figure 1 at the point in the folds will form a thickness of several sheets of material. Excepting for this reason, the device of Figures 1 and 2 is just as suitable for the mailing folder to be described as the device of Figure 5.

The advertising device is attached to or forms a part of a sheet or folder 50 and may be a part of this sheet by extending outwardly from one of the edges of the folder such as the edge 51. The advertising device is folded along the edge 51 until it overlays the lower portion of the folder 50. The upper portion of the folder is then bent over the advertising device so that it lies between the closed portions of the folder. One of the sides of the folder is therefore suitable to receive an address for mailing and the entire folder may be held together by the usual sticker or in any way desired. An envelope is therefore unnecessary for mailing the device.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:

1. A device of the character described comprising a background member having a slot therein, a slider carried by and in back of the background member and slidable relatively thereto, a movable member carried by the slider projecting through the slot and extending over the background, an indicator carried by the slider and movable therewith, the indicator extending over the background and movable relatively thereto, and indicia carried by the background member to which the indicator refers.

2. A device of the character described comprising a background member having a slot therein, a slider carried by and in back of the background member and slideable relatively thereto, a movable member carried by the slider projecting through the slot and extending over the background, an elongated opening in the background through which the slider is visible, and an indicator carried by and movable with the slider and visible through the elongated opening.

3. A device of the character described comprising a background member having a slot therein, a slider carried by and in back of the background member and slidable relatively thereto, a movable member carried by the slider projecting through the slot and extending over the background, an elongated opening in the background through which the slider is visible, an indicator carried by and movable with the slider and visible through the elongated opening, indicia along the edge of the opening, and a second indicator carried by and movable with the slider and positioned adjacent to the elongated opening and indicia.

4. A device of the character described comprising a background member having a slot therein, a slider carried by and in back of the background member and slidable relatively thereto, a movable member carried by the slider projecting through the slot and extending over the background, an elongated opening in the background through which the slider is visible, indicia along the edge of the opening, an indicator carried by and movable with the slider and positioned adjacent to the elongated opening and indicia, and a colored portion upon the slider movable in the elongated opening upon movement of the slider.

5. A device of the character described comprising a background member having a slot therein, a slider carried by and in back of the background member and slidable relatively thereto, a movable member carried by the slider projecting through the slot and extending over the background, an opening in the background through which the slider is visible, and a colored portion upon the slider visible in the opening in one position of the slider.

6. A device of the character described comprising a background member having a slot therein, a slider carried by and in back of the background member and slidable relatively thereto, a movable member carried by the slider projecting through the slot and extending over the background, an opening in the background through which the slider is visible, and a colored portion upon the slider visible in the opening in one position of the slider, and at least one different colored portion upon the slider and movable into position at the opening upon movement of the slider.

7. A device of the character described comprising a background member having a slot therein, a slider carried by and in back of the background member and slidable relatively thereto, a movable member carried by the slider projecting through the slot and extending over the background, and a double fold carried at one end of the background member and bendable in back of the background, the fold opening out laterally of the background, and the outer fold being secured to the slider.

8. A device of the character described comprising a background member having a slot therein, a slider carried by and in back of the background member and slidable relatively thereto, a movable member carried by the slider projecting through the slot and extending over the background, a double fold carried at one end of and foldable in back of the background member, and a vertical slot in the background member through which the slider projects, the projecting portion of the slider being attached to the outer fold.

9. A device of the character described comprising a background member having a slot therein, a slider carried by and in back of the background member and slidable relatively thereto, a movable member carried by the slider projecting through the slot and extending over the background, and a sheet having a single fold carried with the background member, the sheet forming a backing for the background member, and the foldable portion being bendable over the front of the background member to form a unitary mailing enclosure for the device.

10. A device of the character described comprising a background member having a slot therein, a slider carried by and in back of the background member and slidable relatively thereto, a movable member carried by the slider projecting through the slot and extending over the background, and a sheet having a single fold carried upon a side edge of the background member, the sheet being bendable backward of the background member to form a backing therefor, and the foldable portion being bendable over the front of the background member to form a unitary mailing enclosure for the device.

In testimony whereof I affix my signature.

MAX V. MILLER.